Figure 1:
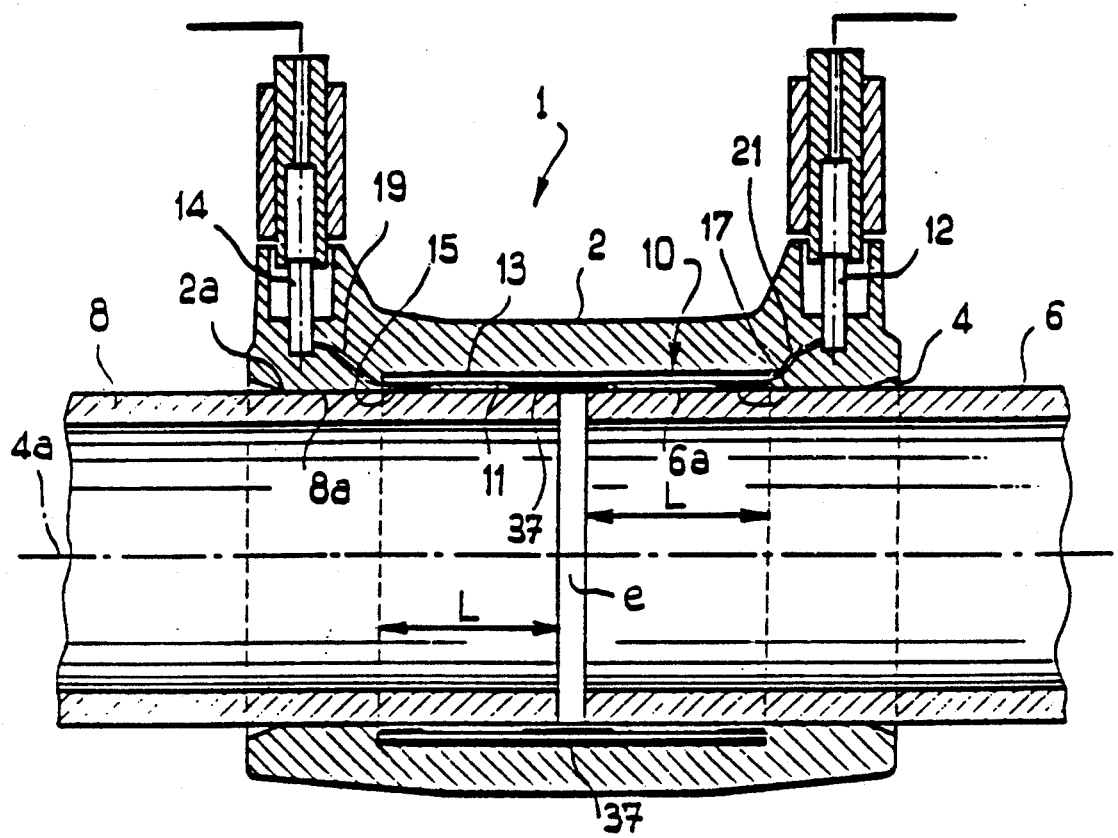

United States Patent
Dufour et al.

[11] Patent Number: 5,182,440
[45] Date of Patent: Jan. 26, 1993

[54] PROCESS AND CONNECTION COMPONENT USING AN ELECTRICAL RESISTOR FOR THE WELDING OF PLASTIC ELEMENTS

[75] Inventors: Denis Dufour, Deuil La Barre; Francois Fortin, Paris, both of France

[73] Assignee: Gaz de France, Paris, France

[21] Appl. No.: 618,408

[22] Filed: Nov. 27, 1990

[30] Foreign Application Priority Data

Nov. 29, 1989 [FR] France .................... 89 15706

[51] Int. Cl.⁵ .......................................... H05B 3/58
[52] U.S. Cl. ................................ 219/535; 219/517; 219/544; 219/522; 219/517; 156/274.2; 285/286; 264/272.11
[58] Field of Search ............... 219/535, 548, 517, 544, 219/510, 549, 528, 541, 522; 337/405, 403, 406, 299, 298, 297, 414, 415; 156/274.2, 379.7; 264/230, 272.11; 285/286

[56] References Cited

U.S. PATENT DOCUMENTS

| | | | |
|---|---|---|---|
| 4,208,645 | 6/1980 | Harmon et al. | 337/297 |
| 4,306,213 | 12/1981 | Rose | 337/297 |
| 4,540,970 | 9/1985 | Kasamatsu | 337/297 |

FOREIGN PATENT DOCUMENTS

| | | |
|---|---|---|
| 0093821 | 11/1983 | European Pat. Off. |
| 1076356 | 8/1960 | Fed. Rep. of Germany |
| 3605186 | 8/1987 | Fed. Rep. of Germany |
| 585195 | 10/1923 | France |
| 2211607 | 7/1974 | France |
| 2301361 | 9/1976 | France |
| 408177 | 9/1961 | Switzerland |
| 532996 | 1/1973 | Switzerland |

*Primary Examiner*—Bruce A. Reynolds
*Assistant Examiner*—Michael D. Switzer
*Attorney, Agent, or Firm*—Morrison

[57] ABSTRACT

The invention relates to the welding of components made of heat-fusing plastic, using an electrical heating resistor arranged in the thickness of a connection component.

According to the invention, the resistor is a thin electrically conductive layer advantageously formed on a supporting film made of heat-fusing plastic and capable of causing the tearing of the layer at a specific temperature corresponding to the welding temperature of the components.

The invention is used particularly for the thermal welding of polyethylene pipes used in the gas industry.

13 Claims, 2 Drawing Sheets

PROCESS AND CONNECTION COMPONENT USING AN ELECTRICAL RESISTOR FOR THE WELDING OF PLASTIC ELEMENTS

The present invention relates to the assembly of components consisting at least partially of heat-fusing material.

At the present time, such assemblies are essentially carried out by thermal welding. Moreover, this technique is widely used, especially in the gas industry, for making junctions between pipes in distribution networks (particularly polyethylene pipes of a density higher than approximately 925 kg/m$^3$).

According to a process which is very widespread nowadays, the components to be joined, usually pipes, are assembled by means of a connection component.

Whatever the type of this component (sleeve, branch offtake, etc.), it conventionally possesses, embedded in its thickness, an electrical heating resistor generally consisting of a coiled electrically conductive wire arranged in the vicinity of the surface of the component which is to come opposite that of the pipe or pipes.

The welding operation is carried out by placing the parts of the components to be welded opposite one another and by connecting the coiled electrical wire to an electrical source (such as a source of rectified alternating current) which, by the Joule effect, will heat the resistor and bring about the softening of the surrounding plastic of the components to fusion, thereby ensuring the welding.

So that this weld is of good quality, that is to say to obtain a junction sealed against gaseous fluids and a satisfactory mechanical resistance, the heating time must be between a minimum duration allowing a correct weld between the components to be obtained after cooling and a maximum duration lower than that liable to cause thermal damage to the components. With current resistors of the type comprising a coiled electrical wire, it has been noted that, in some cases, the fusion of and consequent exertion of pressure on the plastic of the components causes contacts between turns, with the generation of short-circuits capable precisely of bringing about thermal damage to the material.

In current welding systems, particular junction defects can also occur in view of the relative inaccuracy of the principles employed to determine the best possible duration of the heating corresponding to the "welding time", that is to say to the duration for which the electrical resistor will be supplied with electrical current.

When the welding time is defined automatically, the stopping of welding is often obtained by means of sensors which are arranged in wells made in the connection component at localised places in the welding zone and at an appreciable distance from the coiled electrical heating wire. In view of the spacing between these wells, their arrangement and the relatively low thermal conductivity of the plastics used, if short-circuits occur these can at best be detected only with some delay.

It will also be noted that the production of an electrically weldable union by means of an integrated coiled wire requires a long and difficult step of coiling the wire.

The object of the present invention is particularly to overcome the abovementioned disadvantages by the use of a heating element formed round a thin electrically conductive layer or foil designed to break at an optimum temperature and capable of being deposited on a polymer film preferably of a type different from the plastic polymer comprising the components to be assembled.

According to the invention, therefore, the conventional coiled electrical wire will be replaced by a resistive foil "embedded" in the electrically weldable union and performing the function of a fuse at the welding temperature.

Furthermore, another subject of the invention is a process intended for joining a connection component and at least one other component together by welding, each of them comprising a body made of heat-fusing plastic, this process involving placing opposite one another the said components which have contiguous surfaces defining a welding zone, providing within the connection component a path for the circulation of an electrical current in the welding zone, in the vicinity of the said contiguous surfaces of the components, circulating an electrical current along the said path in order to hear the components, at the location of the said welding zone, to a temperature resulting in their welding, this process being characterised according to the invention in that it also involves:

providing as a path for the circulation of the electrical current a layer or foil of electrically conductive material integrated in the said connection component and capable of breaking at a specific temperature substantially equal to the said welding temperature, and circulating this current through the said foil until a continuous split is caused across this, with a discontinuity of material of the foil, thus bringing about the stopping of the heating as a result of the interruption of current.

It may be noted, at this juncture, that the expression "welding temperature" is to be interpreted as defining the temperature which the components to be joined together must reach at the location of their welding zone (that is to say, in the vicinity of their junction interface) in order to ensure that, during the heating time, these components locally experience fusion and that, after the stopping of this heating and cooling, these same components are joined together in a substantially gas-tight manner, this taking place with a mechanical resistance compatible with their use.

Figure 2:
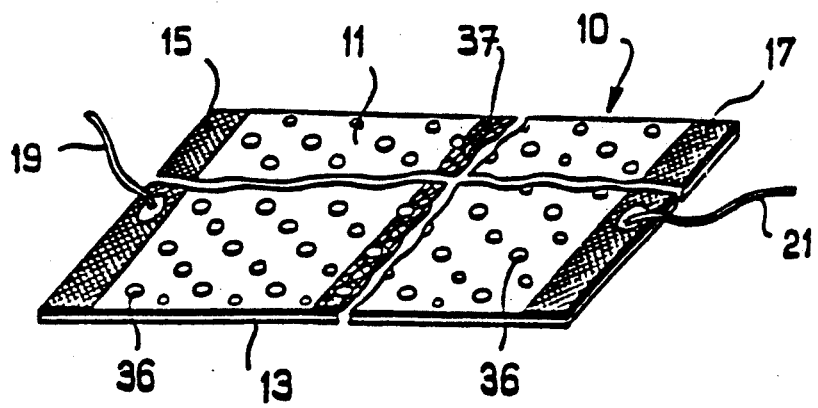
Figure 3:
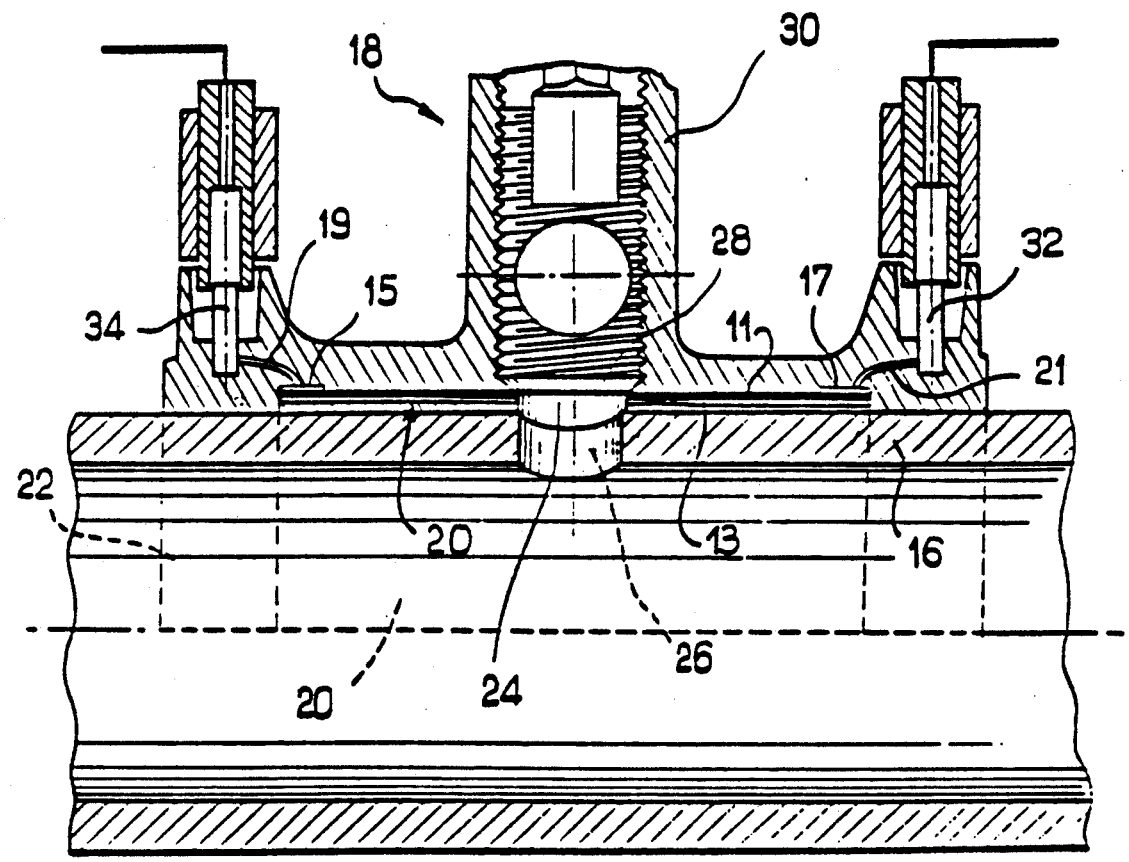
Figure 4:
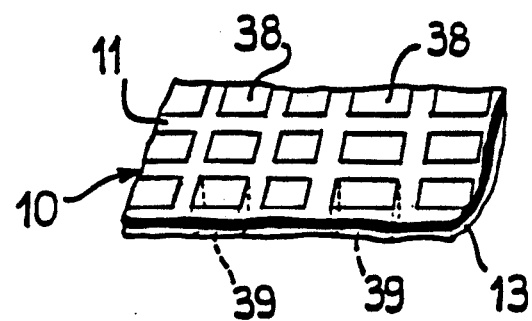

Other explanations, characteristics and advantages of the invention will also emerge from the following description made with reference to the accompanying drawings in which:

FIG. 1 is a diagrammatic view in centre cross-section of a connection system according to the invention which uses a sleeve for connecting two pipes end to end, FIG. 2 is a diagrammatic perspective view of one possible embodiment of the resistive element conceived in the invention, FIG. 3 is an illustration in centre cross-section of an alternative embodiment of the system shown in FIG. 1, which in this particular instance uses a branch offtake for a transverse connection to a pipe, and FIG. 4 is an enlarged local view of an alternative embodiment of the resistive element illustrated in FIG. 2.

Referring first of all to FIG. 1, therefore, this illustrates an electrically weldable union designated as a whole by 1 and comprising a connection sleeve 2 equipped with a body made of heat-fusing plastic, of which the central orifice 4 passing right through it is capable of receiving, in order to connect them, two substantially coaxial pipes 6, 8 of an outside diameter slightly smaller than the diameter of the orifice 4 of the connection sleeve 2.

The two pipes 6, 8 are placed end to end into the orifice 4 of the sleeve. These pipes extend over a length L and along the opposite surfaces 6a, 8a of a zone of connection sleeve 2 (called the welding zone). This zone is limited by the contiguous outer surface 2a and comprises an electrical heating resistor 10 connected by means of two connecting terminals 12, 14 to an electrical energy source (not shown), such as a source of rectified alternating current.

Of the plastics which can be used for producing the body of the sleeve and the pipes to be joined together, mention may be made particularly of polyethylene, polyamide, polybutylene and polypropylene.

According to the invention, as can be seen from the Figures, the electrical heating resistor 10 consists of a layer or foil of electrically conductive material 11. The foil 11 can be formed on a supporting film 13 of heat-fusing plastic, especially by vacuum vapour deposition.

Preferably, the plastic constituting the supporting film 13 will be different from that of the connection sleeve 2, and of the pipes 6 and 8. More specifically, in general terms it will be preferable to use for the supporting film 13 a plastic which has a fusion point higher than that of the plastic of the pipe 6 and 8 and of the body of the connection sleeve 2. Moreover it will be preferable to select for this film a material which, when the film is still in the solid state, has a coefficient of thermal expansion intermediate between that of the electrically conductive material 11 (solid state) and that of the pipes 6 and 8 and connection sleeve (fused state).

In this case, by selecting a layer of electrically conductive material 11 capable of fusing substantially at the welding temperature of the components, a good self-regulation of the welding can be obtained. In fact, as long as the circulation of current in the layer does not increase the temperature of the film to its fusion temperature, the current will circulate normally and the components will be heated. However, as soon as the softening and then fusion temperature of the material constituting the supporting film 13 is reached, the latter will expand, thus giving rise first to cracks in the layer of electrically conductive material 11 and then to the occurrence of a continuous split across and over the entire thickness of this layer, the heating thereby being stopped as a result of the interruption of current.

Of course, the use of such a system has various advantages in relation to the conventional coiled conductive wire, in particular:

the elimination of the risks of short-circuits, a more uniform heating of the components, inasmuch as the heat-exchange surface between the heating element and the components to be assembled is markedly increased, a reduction of the production cost of the connection components which no longer require the use of accessory sensors, a better localisation of the heating flow in the vicinity of the welding interface, inasmuch as the thickness of the conductive foil can be of the order of a few hundred ångstroms, whilst the diameter of a conductive wire is typically of the order of a millimeter, finally, the use of such a resistive layer makes it possible to obtain a truly self-regulated union, since the union itself defines the time during which there is circulation of current, this being in the immediate vicinity of the welding zone, and therefore under the best possible conditions of reliability and efficiency.

As will be appreciated, the provision of a heating resistor of this type made it necessary to rake various parameters into consideration, namely and in particular:

the type of conductive material (usually a metal) composing the layer of electrically conductive material 11, the thickness of this layer, if necessary, the thickness and type of the plastic film constituting the supporting film 13, the dimensions and geometry of the heating element as a whole.

Once these various choices have been made, it was then necessary to provide electrical contacts which were reliable and could be produced on an industrial scale, making it possible to supply electrical current appropriately to the heating element thus obtained.

We shall now deal in succession with these various criteria:

(a) Type of conductive material used, thickness of the metal foil and geometry of the heating element:

These various parameters must be selected so as to obtain a resistor making it possible to reach the appropriate welding temperature in the welding zone of the components.

For an assembly between a polyethylene sleeve and pipes likewise made of polyethylene, in practice temperatures of between approximately 150° C. and 350° to 400° C. must be reached in the vicinity of the contiguous junction surfaces of the components (designated respectively by 2a; 6a and 8a in FIG. 1), this taking place during a time interval of the order of a few minutes. With the welding voltage and the electrical resistance of the heating element being known, the rates of a rise in temperature will be determined by the electrical power dissipated in the assembly.

The heating time will therefore not be a predetermined parameter.

Since the resistance of the heating element is a function of the electrical resistivity of the metal used, of the thickness of the conductive layer, of the passage cross-section of the current in the layer and of the distance separating the electrical contacts, it will easily be possible to calculate the thickness of the metallised layer and select the type of conductive metal, so as to obtain the electrical resistance value making it possible to reach the desired temperatures, with the knowledge that, in the gas industry particularly, it is customary to use a welding voltage of the order of 39 volts.

In general terms, the thickness of the conductive layer will be between approximately $10^{-8}$ and $10^{-7}$ m. Moreover, the conductive material constituting this layer will advantageously be selected in such a way that its fusion temperature is higher than that of the plastic of the supporting film.

Where the geometry of the heating element is concerned, this will of course vary according to the particular desired use.

As regards FIG. 1, that is to say for a junction of two pipes end to end by means of a sleeve, on the assumption of a parallelepipedic sheet 10 (as illustrated in FIG. 2) a sleeve was produced, the resistive sheet being embedded in the thickness of this and here having the form of a cylinder of an axis coinciding substantially with that 4a of the central orifice 4 of the sleeve. Because of the composition of this resistive element, it was possible to integrate the latter in the immediate vicinity of the inner surface 2a of the union, hence as near as possible to the opposite outer junction surfaces 6a, 8a of the two pipes.

However, other embodiments could also be considered.

For example, in the instance (illustrated in FIG. 3) of a connection of a pipe, such as 16, and a branch offtake, such as 18, covering the pipe locally by means of a saddle 22, the resistive layer designated by 20 and composed in the same way as before possesses, as seen in a plan view, a substantially parallelepipedic rectangular shape curved in the manner of a saddle. After the welding and cooling of the components, central orifice 24 corresponding to the orifice 26 of the pipe by which the latter communicates with the inner passage 28 of the shank 30 of the branch offtake is obtained through the resistor 20 (plastic film + conductive layer).

Of course, the resistive layer 20 is connected, as before, to two connecting terminals, such as 32 and 34, for supplying it with electrical energy.

Whatever the particular use adopted, in order to ensure a mechanical resistance of the assembly on either side of the resistive element it will be preferable to pierce the electrically conductive layer and the supporting film in such a way that the element has orifices or apertures 36 (FIG. 2) which pass right through it, these orifices, once the connection component is produced, being filled with the plastic of this component, thus making it possible to ensure a local continuity of the material.

As illustrated in FIG. 4, it is also possible for the layer of electrically conductive material to take the form of a metal grid or of a perforated body produced in the manner of a conductive mesh network deposited in a thin layer on the supporting film 13, here too the meshes 38 or apertures of the grid or of the network being filled with the plastic of the connection sleeve 2, and likewise the orifices 39 which will have been made correspondingly through the supporting film 13.

(b) Choice of supporting film:

As understood, the supporting film 13 of the layer of electrically conductive material 11 performs the function, if provided, of interrupting the heating of the components as a result of the tearing of the layer of electrically conductive material 11 deposited on it.

In practice, this break will be caused by the fusion of the supporting film and the exertion of pressure on it.

Thus, there will be chosen for the film a heat-fusing plastic having a fusion point such that the expansion of the film causes the tearing of the layer of electrically conductive material 11 only at the moment when the welding temperature has been reached in the vicinity of the junction interface of the components.

Studies which it has been possible to conduct hitherto on the subject of assembling polyethylene pipes and connection components by thermal welding have been able to show that the welding temperatures to be reached are of the order of 150° to 250° C. for heating speeds of the order of 20° to 100° C./min.

In general terms, therefore, the supporting film 13 selected will be a film formed from a polymer material having a fusion temperature at least higher than approximately 200° C.

Of the possible polymers, mention may be made by way of example of polyester, polyamide 6, fluorinated polymers (for example, polytetrafluoroethylene), crystalline polycarbonate, phenylene polysulphide and polyimides.

In general terms, at least as regards components to be joined together which are produced from polyethylene, the choice will therefore be limited to heat-fusing plastics having a fusion temperature below approximately 400° C., to prevent any risk of damage to the components as a result of overheating.

In addition to the type of supporting film, its thickness will also be an important element of choice. In most uses, this will be between approximately 5 and 100 $\mu$m (that is to say, 5 to $100 \times 10^{-6}$ m) and preferably equal to approximately 10 $\mu$m.

(c) Production of the electrical contacts

To ensure the connection of the resistive element, it was necessary to make ohmic contacts on the thin layer of electrically conductive material 11. For this purpose, there was provision for employing electrically conductive adhesives, tapes or metallic deposits, these being used in such a way as to obtain lateral electrical contacts, such as those shown at 15, 17 in the Figures.

Once these contacts are made, the electrical connecting wires 19, 21 can be welded to the corresponding connecting terminals.

(d) Generation of a cold zone

Particularly with regard to the junction of two pipes end to end by means of a connection sleeve (see FIG. 1), it also appeared expedient to provide a "cold zone" opposite the mutually confronting ends of the pipes, in order to prevent the possibility that, during the heating or welding, fused material will flow into the free space e separating the pipes, thus risking partially obstructing them.

For this purpose, in the example of FIG. 1, a thin electrically conductive protective strip 37 extending opposite the space e was arranged on the surface of the conductive layer 11 (see FIG. 1).

So that it performs its function, this protective strip 37 will be produced from a preferably metallic material having a fusion temperature higher than the fusion temperature of the surrounding plastic and of the materials constituting the plastic film 13 and indeed even the conductive layer 11.

In general terms, the thickness of the protective strip 37 will be between 3 and 5 $\mu$m.

On the basis of what has just been said, sundry work conducted by the Applicant made it possible to define the following complete (but non-limiting) example, making it possible ro provide a resistive element capable of being used on a polyethylene connection component for the sealed junction of pipes likewise made of polyethylene.

Composition

Supporting film: polyester film of a thickness of approximately 12 $\mu$m,

Electrically conductive layer: aluminium layer of approximately 200 Angstroms (that is to say, $200 \times 10^{-10}$ m), Geometry of the heating element sheet of $10 \times 10$ cm$^2$ pierced with orifices giving it the appearance of a mesh network, Connections by adhesive copper tapes of a thickness of 30 $\mu$m, on which a silver lacquer was deposited, Heating power of the sheet: 0.015 W/mm$^2$.

Results

After approximately 200 seconds, the maximum temperature of the metal layer is approximately 200° C.

The heating is interrupted automatically is a result of a tearing of the metal layer after approximately 250 seconds.

It must be clear, of course, that any suitable means (other than a plastic film) capable, according to the invention, of causing a split in the thin conductive foil at the selected temperature could be used perfectly well, without departing from the scope of the invention. In particular, it ought to be possible, by adapting the thickness and type of this conductive foil, to avoid using the supporting film 13, in which case the electrically conductive material 11 must be shaped so as to break as a result of fusion at a temperature between the fusion temperature of the plastic of the union and of the elements to be joined together and a maximum temperature of damage to these same components. It is found, in practice, that the temperature of damage or of breaking of the molecular chains constituting a component is reached when splashes of fused material and/or the release of smoke occur. The presence of cavities within the components is also a sign of such damage, as is the detection of too deep a fused zone, with risks of leakage in the region of the weld.

We claim:

1. A process for joining a connection component together with at least one other component by welding, each of said connection component and said at least one other component comprising a body made of a heat-fusing plastic, said process comprising:
   placing opposite one another contiguous surfaces of said connection component and said at least one other component, said contiguous surfaces defining a welding zone;
   providing said connection component with a resistive foil of electrically conductive material for the circulation of a current in said welding zone, said resistive foil being embedded in said connection component and being capable of splitting at a temperature substantially equal to a predetermined welding temperature;
   circulating an electrical current through said resistive foil for heating said components to said welding temperature;
   splitting said resistive foil in response to said temperature, said splitting of said resistive foil causing an interruption of said electrical current, whereby said electric current is terminated when said welding temperature exists in said welding zone.

2. A process according to claim 1 wherein the step of splitting includes:
   splitting said electrically conductive foil by forming said resistive foil on a heat-fusing polymer supporting film which, substantially at said welding temperature of the components, has a coefficient of thermal expansion such that, at said temperature, the said heat-fusing polymer supporting film causes a mechanical tearing of said resistive foil.

3. A connection component of heat-fusing plastic, comprising;
   said heat-fusing plastic having a front surface for connecting said component to a corresponding front surface of an element;
   said component including a resistive foil of electrically conductive material embedded proximately to said front surface thereof for fusing said heat-fusing plastic surrounding it at said front surface and thereby for causing welding between said component and said element; and
   said resistive foil having a thickness such that it breaks due to expansion of said heat-fusing plastic at a temperature between a fusion temperature of the plastic of said component and of said element and a maximum temperature of thermal damage of said component and said element.

4. A connection component according to claim 3 wherein said resistive foil is formed on a fusible supporting film embedded in said connection component;
   said fusible supporting film having a coefficient of thermal expansion effective, at a temperature substantially equal to its fusion temperature, to produce sufficient thermal expansion to produce a mechanical break of said resistive foil.

5. A connection component according to claim 4 wherein said resistive foil and said fusible supporting film have a plurality of orifices passing therethrough, said orifices being filled with said heat-fusing plastic of said connection component for ensuring a continuity of plastic material.

6. A connection component according to claim 4 wherein said resistive foil forms a mesh network containing a plurality of perforations, and said supporting film is provided with a plurality of orifices therethrough, said orifices corresponding to and abutting said perforations, said orifices and said perforations being filled with said heat-fusing plastic of said connection component for ensuring a continuity of plastic material.

7. A connection component according to claim 4 wherein a fusion temperature of said supporting film is at least equal to that of said connection component and of said element and lower than that of said electrically conductive resistive foil.

8. A connection component according to claim 4 wherein said supporting film has a thickness between substantially $5 \times 10^{-6}$ and $100 \times 10^{-6}$ m and preferably equal to substantially $10 \times 10^{-6}$ m and said electrically conductive resistive foil has a thickness between substantially $10^{-8}$ and $10^{-7}$ m.

9. A connection component according to claim 4 wherein said supporting film is made of one of the following materials: polyester, polyamide 6, fluorinated polymers, crystalline polycarbonate, phenylene polysulphide and polyimide.

10. A connection component according to claim 3 wherein:
    said connection component consists of a sleeve;
    said elements to be joined together consist of pipes arranged end to end and inserted into said sleeve;
    said sleeve including protective strips arranged opposite abutting ends of said pipes; and
    a fusion temperature of said protective strips being higher than said fusion temperature of said sleeve for providing a protective barrier preventing fused material from flowing in said pipes.

11. A Connection component for tubes made of heat-fusing plastic;
    said component consisting at least partially of heat-fusing material compatible with said plastic of said tubes;
    said component having an inner welding surface for overlapping a corresponding outer welding surface of said tubes;

said component including a cylindrical resistive foil of electrically conductive material arranged in the vicinity of said inner surface thereof for fusing material surrounding said resistive foil and causing welding between said component and said overlapping surfaces; and said resistive foil having a thickness permitting it to break at a temperature between a fusion temperature of said heat-fusing material and of said plastic and a maximum temperature of thermal damage to said heat-fusing material and to said plastic.

12. A connection component according to claim 11, wherein said resistive foil is formed on a fusible supporting film embedded in said connection component.

13. A connection component according to claim 12, wherein said resistive foil and said supporting film include a plurality of orifices therethrough, said orifices being filled with said heat-fusing material of said connection component for ensuring a continuity of plastic material.

* * * * *